(No Model.)

J. H. WHITAKER.
TROTTING HARNESS.

No. 377,727. Patented Feb. 7, 1888.

WITNESSES:
Fred G. Dieterich
Edw. M. Byrn

INVENTOR:
J. H. Whitaker
BY Munn & Co
ATTORNEYS.

UNITED STATES PATENT OFFICE.

JOHN H. WHITAKER, OF DAVENPORT, IOWA.

TROTTING-HARNESS.

SPECIFICATION forming part of Letters Patent No. 377,727, dated February 7, 1888.

Application filed November 19, 1887. Serial No. 255,639. (No model.)

*To all whom it may concern:*

Be it known that I, JOHN H. WHITAKER, of Davenport, in the county of Scott and State of Iowa, have invented a new and useful Improvement in Trotting-Harness, of which the following is a specification.

The object of my invention is to provide a harness attachment to cause trotting horses to spread apart their hind legs, so as to step with the hind feet outside of the line of travel of the fore feet, and thus avoid interfering or striking the hoofs or trotting with one hind foot between the fore feet.

It consists in a shackle-strap or collar designed to inclose the hind leg above the hock, and a yielding connection between said collar and the shaft, which, while it does not impede the travel of the animal, still renders him conscious of restraint, except when traveling with his hind legs far apart.

Figure 1:
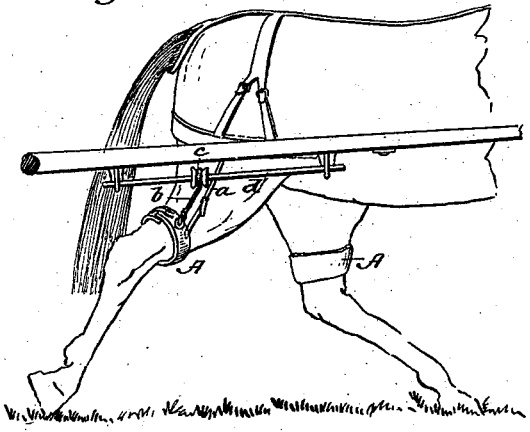
Figure 2:
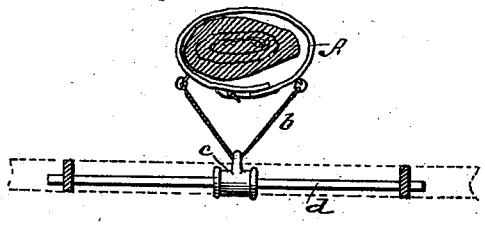
Figure 3:
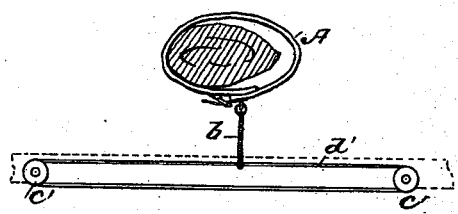
Figure 4:
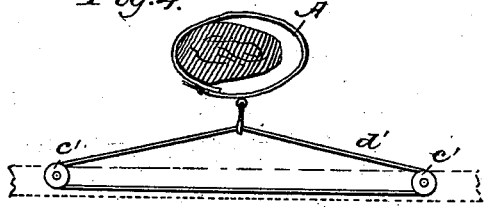
Figure 5:
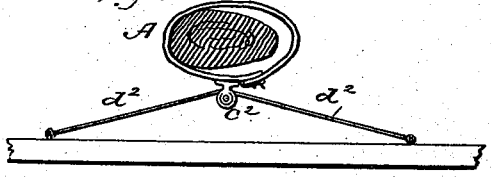

Figure 1 is a side elevation of a horse in harness and connected to the shafts by my invention. Fig. 2 is a plan view, with the position of the leg of the horse indicated in dotted lines. Figs. 3, 4, and 5 are views similar to that shown in Fig. 2 of modifications of my invention.

A is a collar, formed of a flexible leather strap or any other suitable material, loosely encompassing the horse's leg just above the hock. This collar is supported from the breeching by a strap, $a$, so that it does not drop down too low. The said collar is also connected by an elastic cord, $b$, with a sliding sleeve, $c$, arranged to move freely on a rod, $d$, secured to the under side of the shaft or to the top or side of the same. Both the hind legs of the horse are equipped in the same way; and the object is to give the horse a sense of discomfort whenever his hind legs approach a center line between the shafts, and thus compel him to step wide apart with his hind feet. When thus stepping with his hind feet wide apart or near the shafts, the restriction of the connection with the shafts is not felt, and the horse naturally adopts that gait as the most comfortable. This connection, it will be seen, does not seriously impede the action of the horse, first, because the connection is a flexible one, and, secondly, because the shaft connection slides backward and forward with the movement of the leg.

In carrying out my invention I do not confine myself to the rod $d$ and sliding sleeve $c$ as a self-adjusting shaft-connection; but I may, as in Fig. 3, employ an endless belt, $d'$, which passes around two pulleys, $c'$ $c'$, on the shaft, the flexible cord or strap $b$ being connected to the endless belt, in which case the endless belt $d'$ oscillates with the movement of the horse's leg; or I may, as seen in Fig. 4, dispense with the strap $b$ and connect the collar directly to the endless belt $d'$ by simply making the belt large enough to give a little slack; or I may, as in Fig. 5, secure the ends of a cord, $d^2$, to the shafts and affix a pulley, $c^2$, to the collar, so that this pulley travels back and forth on the cord, it only being necessary that the collars or shackles about the horse's legs should have a connection with the shafts which adjusts itself to the stride of the horse.

Having thus described my invention, what I claim as new is—

1. The loose collar or shackle for a horse's hind leg, combined with a yielding connection with the shafts, arranged, as described, to adapt itself to the stride of the horse, substantially as and for the purpose described.

2. The collar or shackle for a horse's hind leg, combined with a supporting-strap connecting with the same, and a shaft-connection arranged to adapt itself to the stride of the horse, substantially as and for the purpose described.

3. The combination of the collar or shackle A, the flexible connection $b$, rod $d$, attached longitudinally to the shaft, and a sleeve, $c$, sliding thereon and attached to the flexible connection $b$, substantially as and for the purpose described.

JOHN H. WHITAKER.

Witnesses:
M. D. SNYDER,
D. H. HARTWELL.